US012720547B2

(12) United States Patent
Yang et al.

(10) Patent No.: US 12,720,547 B2
(45) Date of Patent: Aug. 25, 2026

(54) SYSTEMS AND METHODS FOR A NETWORK MULTIPLE-INPUT AND MULTIPLE-OUTPUT (MIMO) SCHEME

(71) Applicant: Verizon Patent and Licensing Inc., Basking Ridge, NJ (US)

(72) Inventors: Jin Yang, Orinda, CA (US); Lei Song, San Diego, CA (US); Zheng Zhao, Plainsboro, NJ (US); Edward Diaz, Bridgewater, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 676 days.

(21) Appl. No.: 18/166,198

(22) Filed: Feb. 8, 2023

(65) Prior Publication Data

US 2024/0267921 A1 Aug. 8, 2024

(51) Int. Cl.

| | |
|---|---|
| ***H04B 7/0452*** | (2017.01) |
| ***H04B 7/00*** | (2006.01) |
| ***H04J 13/00*** | (2011.01) |
| ***H04L 12/26*** | (2006.01) |
| ***H04W 72/12*** | (2023.01) |
| ***H04W 72/20*** | (2023.01) |

(52) U.S. Cl.

CPC .......... *H04W 72/20* (2023.01); *H04J 13/004* (2013.01); *H04W 72/12* (2013.01)

(58) Field of Classification Search

CPC ..... H04W 36/00; H04W 72/20; H04W 72/12; H04J 13/004; H04B 7/024; H04B 7/068; H04B 7/0452; H04L 5/0037

See application file for complete search history.

(56) References Cited

U.S. PATENT DOCUMENTS

| | | | | |
|---|---|---|---|---|
| 10,340,986 B2 * | 7/2019 | Li | ......................... | H04L 5/0037 |
| 2011/0098072 A1 * | 4/2011 | Kim | ..................... | H04B 7/0456<br>455/509 |
| 2013/0022144 A1 * | 1/2013 | Kotecha | ............... | H04B 7/0634<br>375/267 |
| 2023/0115253 A1 * | 4/2023 | Sandberg | ............ | H04L 25/0224<br>370/252 |
| 2023/0417861 A1 * | 12/2023 | Edge | ................... | H04W 64/003 |
| 2024/0225474 A1 * | 7/2024 | Greene | ............ | G06K 19/07771 |
| 2025/0158771 A1 * | 5/2025 | Matsumura | ........... | H04L 5/0051 |

FOREIGN PATENT DOCUMENTS

| | | | | |
|---|---|---|---|---|
| CN | 101984571 A * | 3/2011 | | |
| WO | WO-2016064901 A1 * | 4/2016 | ........... | H04L 5/0007 |

* cited by examiner

*Primary Examiner* — Jayanti K Patel

(57) ABSTRACT

In some implementations, a control device may transmit, to a set of radio units (RUs), an indication of orthogonal codes for respective RUs from the set of RUs, wherein the set of RUs are non-collocated. The control device may transmit, to one or more user equipment (UEs), an indication of the orthogonal codes for the respective RUs from the set of RUs. The control device may transmit, to the set of RUs, control information to cause the set of RUs to transmit orthogonal transmissions, using the orthogonal codes, to at least one UE from the one or more UEs.

20 Claims, 8 Drawing Sheets

200

600

SYSTEMS AND METHODS FOR A NETWORK MULTIPLE-INPUT AND MULTIPLE-OUTPUT (MIMO) SCHEME

BACKGROUND

Fifth generation (5G) telecommunication networks are focused on providing services at ultra-high speeds and ultra-low latencies. To achieve these production requirements, 5G networks may utilize technologies, such as massive multiple-input and multiple-output (MIMO), beamforming, wider bandwidths, and/or wider channels, among other examples. Massive MIMO provides a way to utilize tens, hundreds, or more antennas into a single base station. The practical implication of massive MIMO is that a user equipment (UE) that previously used one transmitting and receiving channel may now use up to hundreds of channels.

DETAILED DESCRIPTION OF EXAMPLE EMBODIMENTS

Figure 1A:
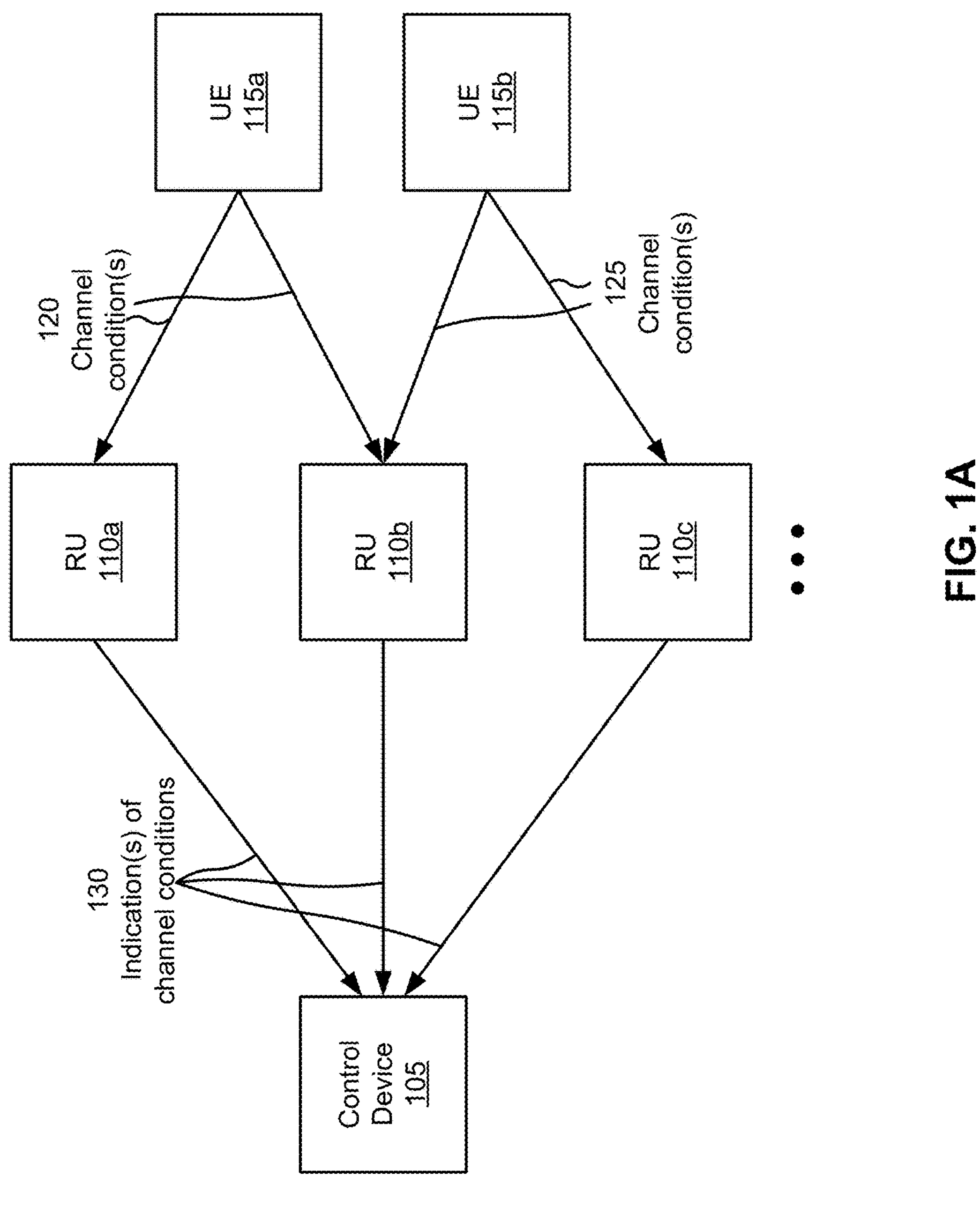
FIGS. 1A-1C are diagrams of an example associated with a network multiple-input and multiple-output (MIMO) scheme.

The following detailed description of example implementations refers to the accompanying drawings. The same reference numbers in different drawings may identify the same or similar elements.

Fifth generation telecommunication networks seek to provide high-speed, high-capacity services at low latencies by utilizing technologies, such as massive MIMO, beamforming, wider bandwidths, and/or wider channels, among other examples. The practical implication of massive MIMO is that UEs that previously used one transmitting and receiving channel may now use up to hundreds of channels. This allows transmission of many bits in parallel, delivering a higher capacity. For example, massive MIMO is a wireless communication technology that uses a large number of antennas at the base station (e.g., a transmitter) and at the UE (e.g., a receiver) to improve system capacity, spectral efficiency, and/or energy efficiency, among other examples. Massive MIMO may be associated with the use a large number of antennas to simultaneously transmit and receive signals, enabling a wireless communication system to support a large number of users with high data rates and low latency. Additionally, massive MIMO can also improve the link reliability and robustness in the presence of interference and fading. A base station and/or a UE may use beamforming to limit interference during these transmissions by allowing a base station to track the UE and point an antenna beam in a direction that gives the UE better signal quality. In addition, 5G networks may utilize wider channels by transmitting signals at higher frequency bands, such as the millimeter wave (mmWave) band.

For example, massive MIMO schemes may allow a base station to transmit and/or receive signals utilizing tens, hundreds, or more antennas. In some cases, massive MIMO schemes may use break-before-make handovers. A handover may be the process of transferring a UE's connection from one base station to another as the UE moves through different coverage areas of a wireless network. A break-before-make handover is a type of handover (or handoff) mechanism used in wireless communication systems. In a break-before-make handover, the UE may first terminate a current connection with a current base station before establishing a new connection with a target base station. This may cause an interruption in service while the new connection is established. This increases latency and may cause interruptions in service for the UE. For example, because the radio units (e.g., antennas of a transmitter, such as a base station) may be collocated, the UE may need to be handed over to a different base station (e.g., using a break-before-make handover) as the UE moves through different coverage areas of the wireless network.

In some cases, in an attempt to mitigate latency in a wireless network using a massive MIMO scheme, a dual packet data convergence protocol (PDCP) layer aggregation technique may be used. PDCP is a protocol used in wireless communication systems to manage the transfer of data packets between the radio access network and the core network. The PDCP layer is associated with compression, encryption, integrity protection, and/or reordering and duplication detection, among other examples, of data packets. In dual PDCP aggregation, two PDCP protocol instances may be used simultaneously, one for uplink communication and one for downlink communication. This allows for the aggregation of multiple packets into a single data unit, which reduces the number of transmissions required to transfer the same amount of data. Dual PDCP aggregation may result in an increase in system capacity and spectral efficiency, as well as a reduction in latency. However, dual PDCP aggregation may be associated with low efficiency for dense cell deployments with multiple radio nodes (e.g., multiple transmitters and/or multiple base stations located in a relatively small area).

As another example, in an attempt to mitigate latency in a wireless network using a massive MIMO scheme, session continuity may be maintained for a UE by a control device (e.g., a base station, a central unit (CU), a distributed unit (DU), and/or a core network device) for higher layer sessions, such as protocol data unit (PDU) session, among other examples. For example, higher layers may be associated with more advanced functions of wireless communications, such as data compression, encryption, error correction, and/or routing, among other examples. A control device may attempt to maintain a higher layer session for the UE as the UE is handed over from one base station to another. However, as a density of a cell deployment increases, the quantity of handovers may increase and a complexity associated with maintaining session continuity for a UE may also increase. As a result, the control device may be unable to maintain session continuity at the higher layers for the UE, resulting in a session breakdown and increased latency associated with re-establishing the higher layer sessions.

For example, dense cell deployment is a wireless communication strategy that may be associated with increasing a number of transmitters (e.g., base stations and/or radio units (RUs)) in a given area to provide more coverage and capacity. The dense cell deployment may be achieved by decreasing the distance between base stations and increasing their transmission power. A dense cell deployment may improve a wireless communication system capacity, spectral efficiency, and/or energy efficiency, among other examples by reducing the cell radius and increasing the number of UEs that can be supported in a given area. Additionally, a dense cell deployment can improve a link reliability and robustness in the presence of interference and/or fading. However, increasing the number of transmitters (e.g., base stations and/or RUs) in a given area may increase the number of handover procedures performed as the UE moves through an area associated with the dense cell deployment. This may increase latency and interruptions associated with performing an increased number of handover procedures (e.g., break-before-make handover procedures). Additionally, the dense cell deployment may increase complexity associated with a massive MIMO scheme because of the increased number of transmitters to be managed and/or synchronized within a given area.

Some implementations described herein enable a network MIMO scheme (e.g., for dense cell deployments). In some implementations, a control device may manage lower layer (e.g., physical (PHY) layer and/or medium access control (MAC) layer) procedures and/or operations of radio nodes (e.g., base stations and/or RUs) and UEs in a wireless network (e.g., in addition to higher layer procedures and/or operations). This may enable the control device to synchronize communications and enable make-before-break handovers in the wireless network, thereby reducing latency and interruptions in service for UEs in the wireless network.

For example, in some implementations, the control device may control multiple transmissions (e.g., multiple radiations) from multiple radio nodes (e.g., base stations and/or RUs), in a dense cell deployment, that are non-collocated (e.g., that are physically positioned in different locations within a given area). As used herein, "non-collocated" may refer to not being positioned on the same antenna face or on the same antenna panel. In some implementations, the multiple radio nodes may be configured (e.g., by the control device) to transmit orthogonal signals from multiple non-collocated ports (e.g., considering radio channel information for respective radio nodes). A receiver (e.g., a UE) may reconstruct the receive signal utilizing known orthogonal codes used by respective non-collocated radio nodes in the wireless network.

In some implementations, a control device may transmit, and a set of RUs may receive, an indication of orthogonal codes for respective RUs from the set of RUs. The orthogonal codes may be precoders to be applied by the set of RUs when transmitting a signal to a UE. For example, control device may determine the orthogonal codes based on channel information, associated with channels between RUs and UEs, from the respective RUs. The channel information may include an estimated channel (e.g., a channel estimation). The transmissions from the set of RUs may be synchronized (e.g., in the time domain) by the control device and may be orthogonal based on the channel information (e.g., based on an estimated channel). This may enable a UE to receive signals from multiple non-collocated ports (e.g., multiple non-collocated RUs) and reconstruct a signal using orthogonal codes and channel information for respective RUs from the multiple non-collocated RUs.

As a result, a UE may move through a cell deployment and may maintain a connection with at least one RU at all times. For example, by enabling synchronized orthogonal transmissions from multiple non-collocated ports, a UE may be enabled to maintain connections with multiple RUs and may reconstruct a communication via signals received from respective RUs. If the UE loses a connection with a given RU, then the UE may simply remove a precoder and/or channel information associated with the given RU from a decoding matrix used by the UE to reconstruct communication. Similarly, if the UE establishes a connection with a given RU, then the UE may simply add a precoder and/or channel information associated with the given RU to the decoding matrix used by the UE to reconstruct communication.

Therefore, a likelihood that the UE is able to maintain a continuous connection to a wireless network as the UE moves through a given area (e.g., and establishes or loses connections with RUs in the process) is improved. Maintaining a continuous connection to a wireless network as the UE moves through a given area reduces latency and/or interruptions to service, among other examples, for communications associated with the UE. Additionally, the network MIMO operations described herein enable improved efficiency and capacity for dense cell deployments because of the controlled interface through the orthogonality of precoders applied by non-collocated transmitters (e.g., base stations and/or RUs) in the wireless network.

Figure 1B:
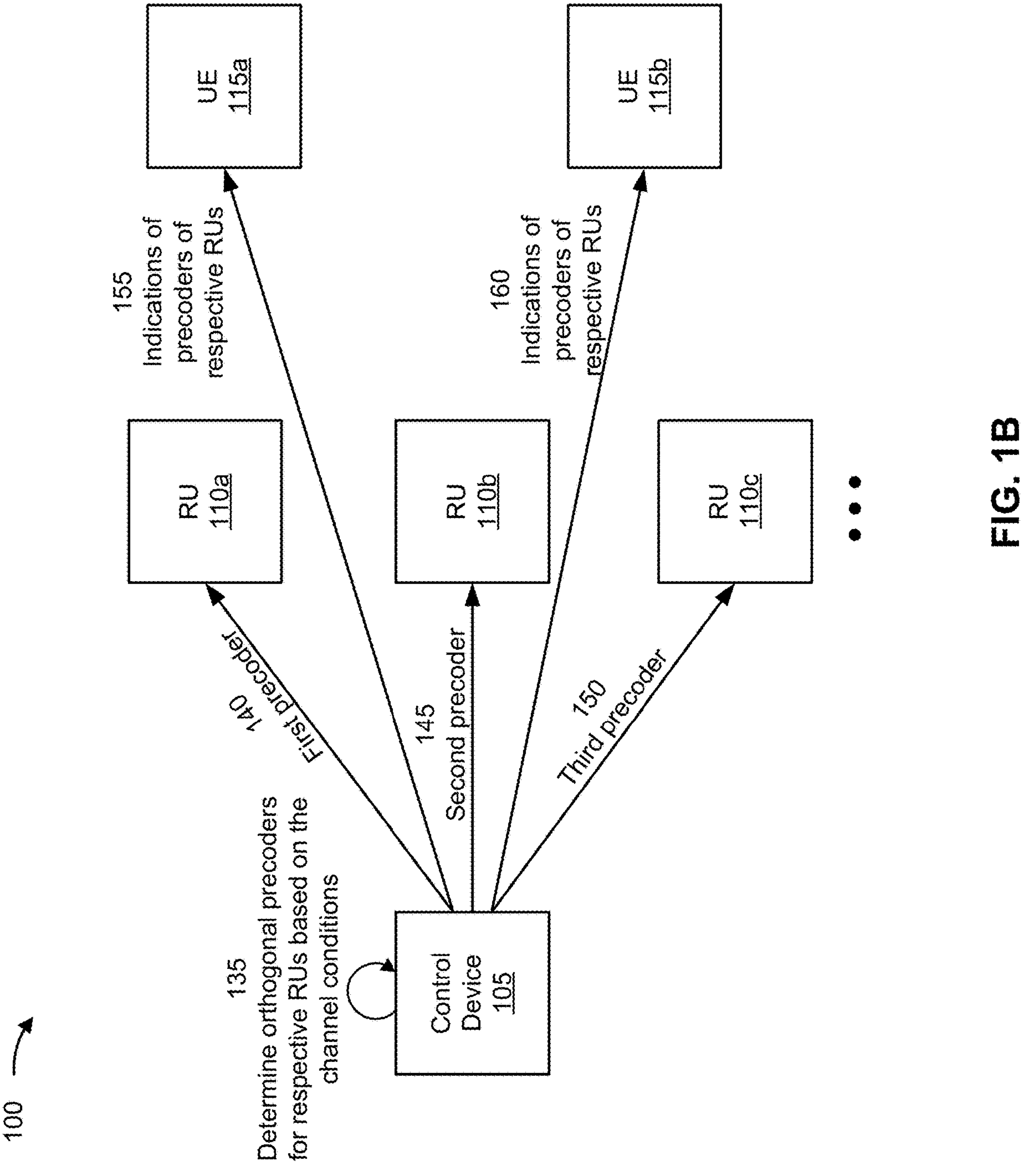
Figure 1C:
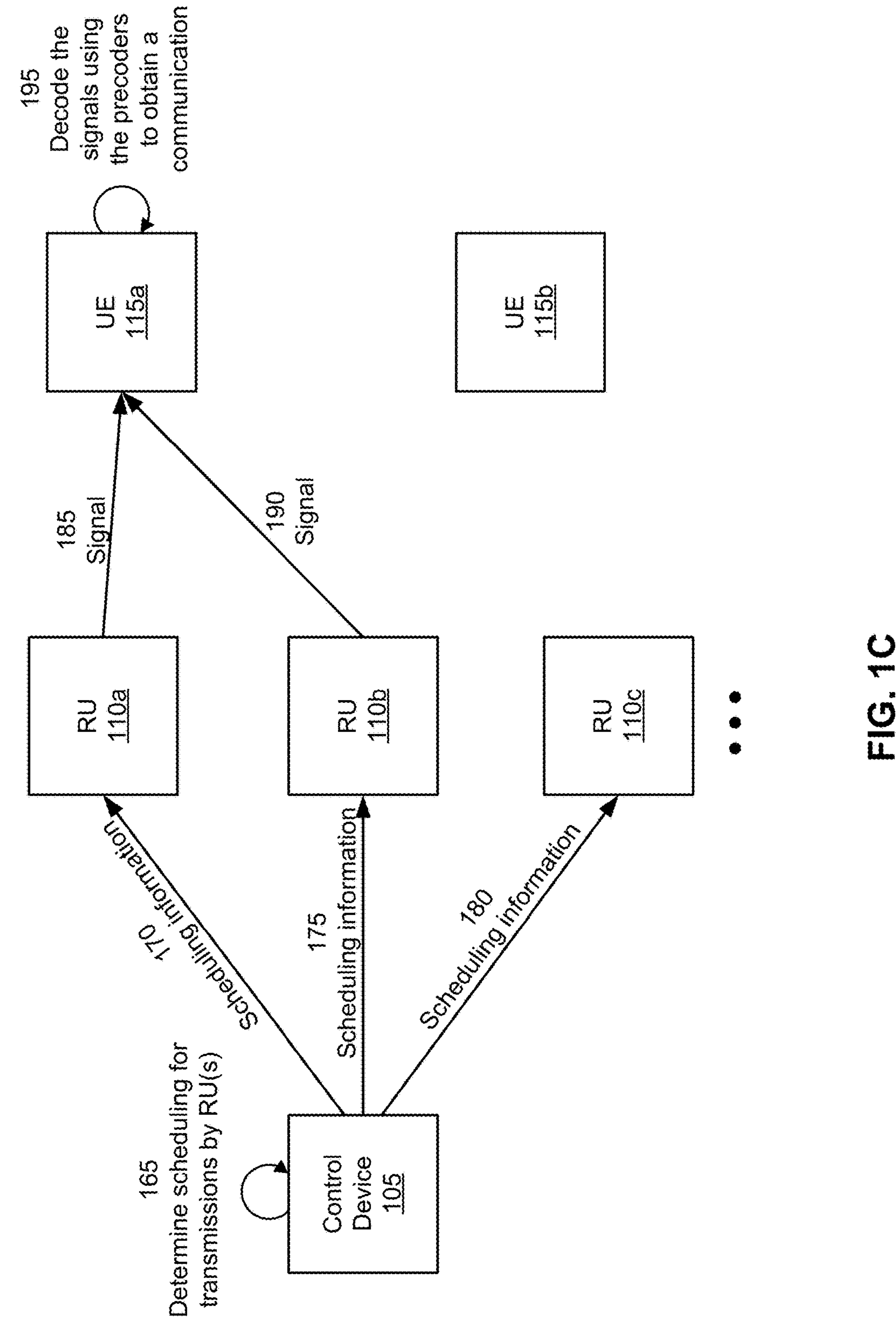

FIGS. 1A-1C are diagrams of an example 100 associated with a network MIMO scheme. As shown in FIGS. 1A-1C, example 100 includes a control device 105, one or more RUs 110 (e.g., shown as RU 110*a*, RU 110*b*, and RU 110*c* as an example), and one or more UEs 115 (e.g., shown as UE 115*a* and UE 115*b* as an example). These devices are depicted and described in more detail in connection with FIGS. 3 and 4.

As shown in FIG. 1A, the UEs 115 may report channel conditions measured and/or sensed by the UEs 115 to a network device, such as an RU 110. For example, as shown by reference number 120, the UE 115*a* may transmit, and the RU 110*a* may receive, an indication of channel conditions associated with a channel between the UE 115*a* and the RU110*a*. Similarly, the UE 115*a* may transmit, and the RU110*b* may receive, an indication of channel conditions associated with a channel between the UE 115*a* and the RU110*b*. For example, the UE 115*a* may be associated with connections with both the RU110*a* and the RU110*b*.

As shown by reference number 125, the UE 115*b* may transmit, and the RU 110*b* may receive, an indication of channel conditions associated with a channel between the UE 115*b* and the RU110*b*. Similarly, the UE 115*b* may transmit, and the RU110*c* may receive, an indication of channel conditions associated with a channel between the UE 115*b* and the RU110*c*. For example, the UE 115*b* may be associated with connections with both the RU110*b* and the RU110*c*. In other words, each UE 115 may estimate and/or measure channel conditions associated with a channel for each active connection associated with the UE 115. The UE 115 may report, to respective RUs 110, channel conditions of channels between the UE 115 and the respective RUs 110.

The channel conditions may include channel information. Channel information may refer to the characteristics of the communication channel between a transmitter (e.g., a base station or an RU 110) and a receiver (e.g., a UE 115). There may be different types of channel information, such as channel state information (CSI), a channel impulse response (CIR), and/or a channel transfer function (CTF), among other examples. CSI may be a set of parameters that describe the instantaneous state of the channel. The CSI may be estimated at a receiver and fed back to (e.g., reported to and/or transmitted to) a transmitter. The CSI may be used to optimize the transmission parameters, such as a modulation and coding schemes, a power allocation, and precoding, among other examples. The CIR may be a measure of the response of the channel to a known impulse signal. The CIR may be estimated at the receiver and used (e.g., by the receiver and/or the transmitter) to equalize the channel distortions, such as the multipath fading and/or the inter-symbol interference, among other examples. The CTF may be a measure of the response of the channel to a known input signal. The CTF may be estimated at the transmitter and used to pre-compensate the channel distortions before a signal is transmitted.

As shown by reference number 130, the RUs 110 may transmit, and the control device 105 may receive, an indication of channel conditions for channels associated with respective RUs 110 and respective UEs 115. For example, the control device 105 may receive channel information, associated with channels between RUs 110 and UEs 115, from the respective RUs 110. In some implementations, the channel information may be measurements or reports that are performed by a UE 115 and reported to (e.g., transmitted to) an RU 110. As another example, the channel information indicated by an RU 110 to the control device 105 may include an indication of an estimated channel (e.g., an estimated channel matrix). For example, the RU 110 may estimate a channel based on measurements indicated by the channel condition(s) reported by a UE 115. As another example, the control device 105 may estimate a channel based on measurements indicated by the channel condition(s) reported by an RU 110 to the control device 105.

An estimated channel may refer to characteristics of the wireless channel that is obtained through estimation techniques. The wireless channel may vary rapidly due to the mobility of UEs 115, the weather conditions, and/or the environment, among other examples. There may be different techniques to estimate the channel, such as pilot-based channel estimation, pilot-less channel estimation, and/or compressed sensing, among other examples. Pilot-based channel estimation uses known reference signals, referred to as pilots, that are transmitted by an RU 110 and received by a UE 115. The UE 115 may use the received pilots to estimate the channel. Pilot-less channel estimation is associated with a UE 115 using data signals themselves to estimate the channel. Pilot-less channel estimation does not require the transmission of the pilots and thus saves some of the available bandwidth of the UE 115. Compressed sensing is a technique that uses the sparsity of the channel to estimate the channel more efficiently. Compressed sensing uses advanced mathematical algorithms to reconstruct the channel from a small number of measurements. Compressed sensing can be used in both pilot-based and pilot-less channel estimation. In some implementations, a UE 115 may transmit, and an RU 110 may receive, measurements (e.g., reference signal received power (RSRP) measurements, signal-to-noise ratio (SNR) measurement, and/or other measurements) associated with channel estimations.

In some implementations, an RU 110 may estimate and/or determine an estimated channel (e.g., an estimated channel matrix) based on the reported measurements. In other examples, the control device 105 may estimate and/or determine an estimated channel (e.g., an estimated channel matrix) based on the reported measurements. A channel matrix may be a matrix that describes the interactions between the transmit and receive antennas of a given transmitter (e.g., an RU 110) and a given receiver (e.g., a UE 115). The entries of the matrix may represent the complex coefficients that describe the amplitude and phase shifts of a signal as the signal propagates through the channel. The coefficients may be affected by the environment, such as buildings, trees, and/or other obstacles that the signal encounters.

An estimated channel matrix is a matrix that is derived from measurements or simulations of the channel (e.g., measurements performed by a UE 115 and/or an RU 110). The estimated channel matrix may be an approximation of the true channel matrix, because the actual channel can be difficult or impossible to measure directly. The estimated channel matrix may be used in various signal processing techniques, such as beamforming and equalization, to improve the performance of the wireless network. The estimated channel matrix may be obtained through various methods such as the least square method, the maximum likelihood method, and the linear minimum mean square error method.

In some implementations, an RU 110 may determine estimated channel matrices for respective channels associated with the RU 110. In such examples, the RU 110 may transmit, and the control device 105 may receive, an indication of the estimated channel matrices for respective channels associated with the RU 110. In other examples, the control device 105 may determine estimated channel matrices for respective channels associated with the RU 110. In such examples, the control device 105 may transmit, and the RU 110 may receive, an indication of the estimated channel matrices for respective channels associated with the RU 110.

As shown in FIG. 1B, and by reference number 135, the control device 105 may determine orthogonal precoders for respective RUs based on the channel conditions. Orthogonality is a mathematical concept that is used in wireless communication systems to improve the signal quality and increase the system capacity. The concept of orthogonality refers to the property of two or more signals that are uncorrelated and do not interfere with each other. In wireless communication systems, orthogonality is used to separate the signals of different users or different channels in the frequency, time, and/or space domains. Orthogonal precoders may refer to precoders that cause signals to be orthogonal.

Precoders, which may also be referred to as precoding or beamforming, are a technique used in wireless communication systems to improve the signal quality and increase the capacity of the system. Precoders may be applied at a transmitter to precondition the signal before the signal is transmitted over the channel. Precoders may be implemented in the form of complex weighting factors applied to the signals. The weighting factors may be referred to as beamforming vectors. The goal of precoding may be to focus the energy of the signals in the direction of the intended receiver while minimizing the interference to other UEs 115. There are different types of precoders, such as zero-forcing (ZF) precoders, minimum mean-square error (MMSE) precoders, and/or regularized zero-forcing (RZF) precoders, among other examples.

ZF precoders may be used to cancel the interference between the UEs 115 by zeroing out the interference term in the received signal. ZF precoders may provide a high signal-to-interference-plus-noise ratio (SINR), but ZF precoders require a high quality channel state information (CSI) at the transmitter side. MMSE precoders are used to balance the trade-off between the interference cancellation and the noise enhancement. MMSE precoders may provide a lower SINR than ZF precoders, but MMSE precoders may be more robust to errors in the CSI. RZF precoders may be used to regularize the ZF precoders by adding a small amount of noise enhancement.

In some implementations, the orthogonal precoders for respective RUs may be associated with a linear precoding technique, a matching filter precoding matrix, an Alamouti space-time coding matrix, an orthogonal matrix, and/or a Walsh code, among other examples. A matching filter precoding matrix may be a linear precoding technique that is used to precode the data symbols before they are transmitted over a wireless channel. Matching filter precoding may be associated with optimizing a transmit signal to match characteristics of the wireless channel in order to maximize the SNR at a receiver. The control device 105 may design the matching filter precoding matrix based on the CSI of a channel. The control device 105 may select the precoding matrix such that the precoded data symbols align with the eigen vectors of the channel matrix, effectively maximizing the power of the data symbols in the direction of the eigen vectors and minimizing the interference caused by the noise.

The Alamouti space-time coding matrix may be a linear space-time block coding scheme that is used to transmit data over wireless channels. The Alamouti space-time coding matrix scheme may use two transmit antennas to transmit two copies of the same data, but with a certain phase offset between the two copies. This allows for a significant increase in a diversity gain and provides a means for combating the effects of fading and multipath propagation in wireless channels.

Walsh codes may be a type of orthogonal code that can be used for multiple access and spreading. Walsh codes may also be referred to as Hadamard codes. Walsh codes may be implemented as a set of orthogonal functions that can be used to spread a signal over a wide frequency band. In multiple access systems, each UE 115 may be assigned a unique Walsh code, and the transmitted signal may be spread by the use of the assigned Walsh code. The UE 115 may correlate the received signal with the known Walsh codes to detect the intended signal.

As shown in FIG. 1B, the control device 105 may determine precoders for respective RUs 110, of a set of RUs 110, to cause the set of RUs 110 (e.g., that are non-collocated) to transmit orthogonal signals to a UE 115. This enables the control device 105 to control multiple radiations from a dense cell deployment and to leverage non-collocated RUs 110. This also enables the RUs 110 to transmit orthogonal signals from multiple un-collocated ports, taking into account the instantaneous radio channel information. For example, ensuring the signals transmitted by the non-collocated RUs 110 may reduce interference through the orthogonality of precoding streams used by the RUs 110. For example, a precoding stream may refer to an output of a precoding algorithm that is applied to data symbols before the data symbols are transmitted. The precoding algorithm takes the original data symbols and applies a precoding matrix to the data symbols, resulting in a set of precoded data symbols. These precoded symbols are then transmitted over the channel. A precoding stream may also refer to the output of a precoding algorithm applied to a single data stream. In a MIMO system, where multiple data streams are transmitted simultaneously, each data stream can be precoded separately by respective RUs 110 before being transmitted. This improves performance of wireless communications between the RUs 110 and a UE 115 by reducing the interference, increase the SNR, and/or increasing a capacity of the wireless network, among other examples.

As shown in FIG. 1B, the control device 105 may transmit indications of precoders for respective RUs 110. For example, as shown by reference number 140, the control device 105 may transmit, and the RU 110*a* may receive, an indication of a first precoder to be used by RU 110*a*. Similarly, as shown by reference number 145, the control device 105 may transmit, and the RU 110*b* may receive, an indication of a second precoder to be used by RU 110*b*. As shown by reference number 150, the control device 105 may transmit, and the RU 110*c* may receive, an indication of a third precoder to be used by RU 110*c*. The control device 105 may transmit indications of precoders for each RU 110 associated with and/or managed by the control device 105 in a similar manner.

In some implementations, a precoder (e.g., an orthogonal code) for an RU 110 may be based on an estimated channel, indicated by the channel information, associated with a channel that is associated with the RU 110. For example, the orthogonal code may be associated with an inverse of the estimated channel (e.g., an inverse or transpose of an estimated channel matrix of the channel). In some implementations, the orthogonal code may be, or may include, the inverse of the estimated channel (e.g., an inverse or transpose of an estimated channel matrix of the channel).

In some implementations, the control device 105 may update and/or manage the precoders for respective RUs 110 over time. For example, if channel conditions associated with a given RU 110 change, then the control device 105 may update a precoder associated with the given RU 110. For example, the control device 105 may detect that an estimated channel (e.g., an estimated channel matrix) associated with an RU 110 has changed. As a result, the control device 105 may update or change the precoder (e.g., orthogonal code) to be applied by the RU 110. For example, a precoder (e.g., an orthogonal code) for a given RU 110 may be based on an estimated channel (e.g., an estimated channel matrix) associated with the given RU 110. If the estimated channel changes (e.g., based on instantaneous channel information received by the RU 110 and/or the control device 105), then the control device 105 may modify the precoder for the RU 110 accordingly.

In some implementations, the control device 105 may transmit to one or more user UEs 115, an indication of the orthogonal codes for the respective RUs 110 from the set of RUs 110. For example, as shown by reference number 155, the control device 105 may transmit, and the UE 115*a* may receive, an indication of one or more precoders for respective RUs 110. The one or more precoders may be associated with RUs 110 with which the UE 115*a* currently has an active connection. Additionally, or alternatively, the one or more precoders may be associated with all RUs 110 that are associated with the control device 105 (e.g., to enable the UE 115*a* to quickly change, add, and/or remove precoders used by the UE 115*a* to decode orthogonal transmissions as the UE 115*a* moves through a coverage area associated with the RUs 110).

Similarly, as shown by reference number 160, the control device 105 may transmit, and the UE 115*b* may receive, an indication of one or more precoders for respective RUs 110. The one or more precoders may be associated with RUs 110 with which the UE 115*b* currently has an active connection. Additionally, or alternatively, the one or more precoders may be associated with all RUs 110 that are associated with the control device 105. The control device 105 may transmit indications of precoder(s) to be applied by RU(s) 110 to other UEs 115 located within a coverage area of the RU(s) 110 in a similar manner.

As shown in FIG. 1C, the control device 105 may transmit control information to cause the set of RUs 110 to transmit orthogonal transmissions, using the orthogonal codes (e.g., the precoders), to at least one UE 115 from the one or more UEs 115. In some implementations, the control information may be associated with controlling MAC layer operations of the set of RUs 110, and/or one or more PHY layer operations of the set of RUs 110, among other examples. For example, the control information may cause radiated signals transmitted by the set of RUs 110 to be orthogonal transmissions that are synchronized in time to enable a UE 115 to receive the orthogonal transmissions and reconstruct a signal or communication that is intended for the UE 115.

For example, as shown by reference number 165, the control device 105 may determine scheduling for transmissions by one or more RUs 110. For example, the control device 105 may determine scheduling information associated with synchronizing, in the time domain, orthogonal transmissions by one or more RUs 110. In other words, the control information transmitted by the control device 105 may including scheduling information associated with scheduling one or more signals to be transmitted by the one or more RUs 110.

As shown by reference number 170, the control device 105 may transmit, and the RU 110*a* may receive, scheduling information associated with a transmission by the RU 110*a*. Similarly, as shown by reference number 175, the control device 105 may transmit, and the RU 110*b* may receive, scheduling information associated with a transmission by the RU 110*b*. As shown by reference number 180, the control device 105 may transmit, and the RU 110*c* may receive, scheduling information associated with a transmission by the RU 110*c*. The scheduling information may indicate time domain resources, frequency domain resources, and/or spatial domain resources (e.g., beams), among other examples, to be used by the respective RUs 110. In some implementations, the scheduling information may indicate intended recipients (e.g., one or more UEs 115) of the signals to be transmitted by the RUs 110. The control device 105 may transmit, and a UE 115 may receive, scheduling information for signals intended for the UE 115 in a similar manner. Alternatively, an RU 110 may transmit, and a UE 115 may receive, scheduling information for signals intended for the UE 115 to be transmitted by the RU 110.

As shown by reference number 185, the RU 110*a* may transmit, and the UE 115*a* may receive, a first signal. The RU 110*a* may perform precoding associated with the first signal using a first precoder (e.g., a first orthogonal code). The RU 110*a* may transmit, and the UE 115*a* may receive, the precoded signal. As shown by reference number 190, the RU 110*b* may transmit, and the UE 115*a* may receive, a second signal. The RU 110*b* may perform precoding associated with the second signal using a second precoder (e.g., a second orthogonal code). The RU 110*b* may transmit, and the UE 115*a* may receive, the precoded signal. For example, the UE 115*a* may receive the signals using different ports (e.g., different antenna ports). The signals may be transmitted by non-collocated transmitters (e.g., the RU 110*a* and the RU 110*b* may be located in different physical locations). For example, the precoding of the signals may enable synced (e.g., in time) and precoded MIMO for orthogonal transmissions based on projected (e.g., estimated) channel conditions based on received signals from multiple devices (e.g., one or more RUs 110 and/or one or more UEs 115) in a wireless communication system. Similarly, the precoding of the signals may enable transmitters (e.g., RUs 110) to transmit orthogonal signals from multiple non-collocated ports (e.g., antenna ports), taking into account the instantaneous radio channel information.

As shown by reference number 195, the UE 115*a* may decode a set of signals (e.g., the first signal and the second signal) using the precoders associated with respective transmitters (e.g., RUs 110) of the signals. The UE 115*a* may decode the signals to obtain a communication intended for the UE 115*a*. For example, the UE 115*a* may decode the set of signals using a precoding matrix that includes the first orthogonal code associated with the RU 110*a* and the second orthogonal code associated with the RU 110*b*. Additionally, the UE 115*a* may decode the set of signals using an estimated channel matrix associated with a first channel between the UE 115*a* and the RU 110*a* and a second channel between the UE 115*a* and the RU 110*b*. In other words, the UE 115*a* may reconstruct a received signal (e.g., based on transmissions from non-collocated RUs 110) utilizing the known orthogonal codes.

For example, the precoding matrix may include precoders corresponding to respective RUs 110 with which the UE 115*a* currently has an active connection. As the UE 115*a* moves through a coverage area of the wireless network, the UE 115*a* may add or remove precoders from the precoding matrix based on terminating (or ceasing) connections with RUs 110 and/or based on establishing connections with RUs 110. This enables the UE 115*a* to establish connections with a transmitter (e.g., an RU 110) before breaking or terminating a connection with another RU 110. For example, because the UE 115*a* is enabled to reconstruct a communication from multiple non-collocated transmitters, as described herein, the UE 115*a* may be enabled to dynamically establish or terminate connections with transmitters. This improves a likelihood that the UE 115*a* is able to maintain a connection with at least one transmitter (e.g., at least one RU 110) as the UE 115*a* moves through a coverage area of the wireless network.

For example, the precoding matrix may be $[X_{1a}, X_{2a}> \ldots, X_{na}]$, where $X_{1a}$ is a precoder to be applied by the RU 110*a* for transmissions to the UE 115*a*, $X_{2a}$ is a precoder to be applied by the RU 110*b* for transmissions to the UE 115*a*, and $X_{na}$ is a precoder to be applied by an RU 110*n* for transmissions to the UE 115*a*. In the example shown in FIG. 1C, the precoding matrix may be $[X_{1a}, X_{2a}]$, but in other examples more or less precoders may be included in the precoding matrix based on active connections associated with the UE 115*a*. The signals transmitted by respective RUs 110 may be represented by $$I = \begin{matrix} I_1 \\ I_2, \\ I_n \end{matrix}$$

where I is the signal transmitted by the RU 110*a*, $I_2$ is the signal transmitted by the RU 110*b*, and $I_n$ is a signal transmitted by an RU 110*n*. For example, the received signal at the UE 115*a* in the example shown in FIG. 1C may be $$Rx_{UE115a} = [X_{1a}, X_{2a}]\left[\begin{smallmatrix} I_1 \\ I_2 \end{smallmatrix}\right].$$

The UE 115*a* may reconstruct the signal intended for the UE 115*a* using I and the known orthogonal codes (e.g., precoders) applied by the RUs 110.

For example, in some cases, the received signal at the UE 115*a* may be a function of a channel (e.g., a radio channel). For example, for a given signal, what is received by the UE 115*a* may be $Rx_{UE\ 115a} = H \cdot T_x$, where His the radio channel and $T_x$ is what is transmitted at a transmitter (e.g., at an RU 110). In some cases, the precoder applied by a given transmitter (e.g., a given RU 110) may be based on an estimated channel between the transmitter and a given UE 115. For example, the precoder (e.g., orthogonal code) may be an inverse or transpose of an estimated channel matrix. For example, $T_x=H^T \cdot I$. Therefore, the UE 115*a* may be enabled to reconstruct/using an estimated channel, such that $Rx_{UE\ 115a}=H \cdot H^T \cdot T_x$. Other UEs 115 (e.g., the UE 115*b*) may receive signals and decode signals to obtain a communication intended for that UE 115 in a similar manner. This enables a massive MIMO scheme to be expanded from one transmission point (e.g., one radiated point) to multiple non-collocated transmission points (e.g., multiple non-collocated radio points).

Therefore, a likelihood that a UE 115 is able to maintain a continuous connection to a wireless network as the UE 115 moves through a given area (e.g., and establishes or loses connections with RUs 110 in the process) is improved. Maintaining a continuous connection to a wireless network as the UE 115 moves through a given area reduces latency and/or interruptions to service, among other examples, for communications associated with the UE 115. Additionally, the network MIMO operations described herein enable improved efficiency and capacity for dense cell deployments because of the controlled interface through the orthogonality of precoders applied by non-collocated transmitters (e.g., base stations and/or RUs 110) in the wireless network.

As indicated above, FIGS. 1A-1C are provided as an example. Other examples may differ from what is described with regard to FIGS. 1A-1C. The number and arrangement of devices shown in FIGS. 1A-1C are provided as an example. In practice, there may be additional devices, fewer devices, different devices, or differently arranged devices than those shown in FIGS. 1A-1C. Furthermore, two or more devices shown in FIGS. 1A-1C may be implemented within a single device, or a single device shown in FIGS. 1A-1C may be implemented as multiple, distributed devices. Additionally, or alternatively, a set of devices (e.g., one or more devices) shown in FIGS. 1A-1C may perform one or more functions described as being performed by another set of devices shown in FIGS. 1A-1C.

Figure 2:
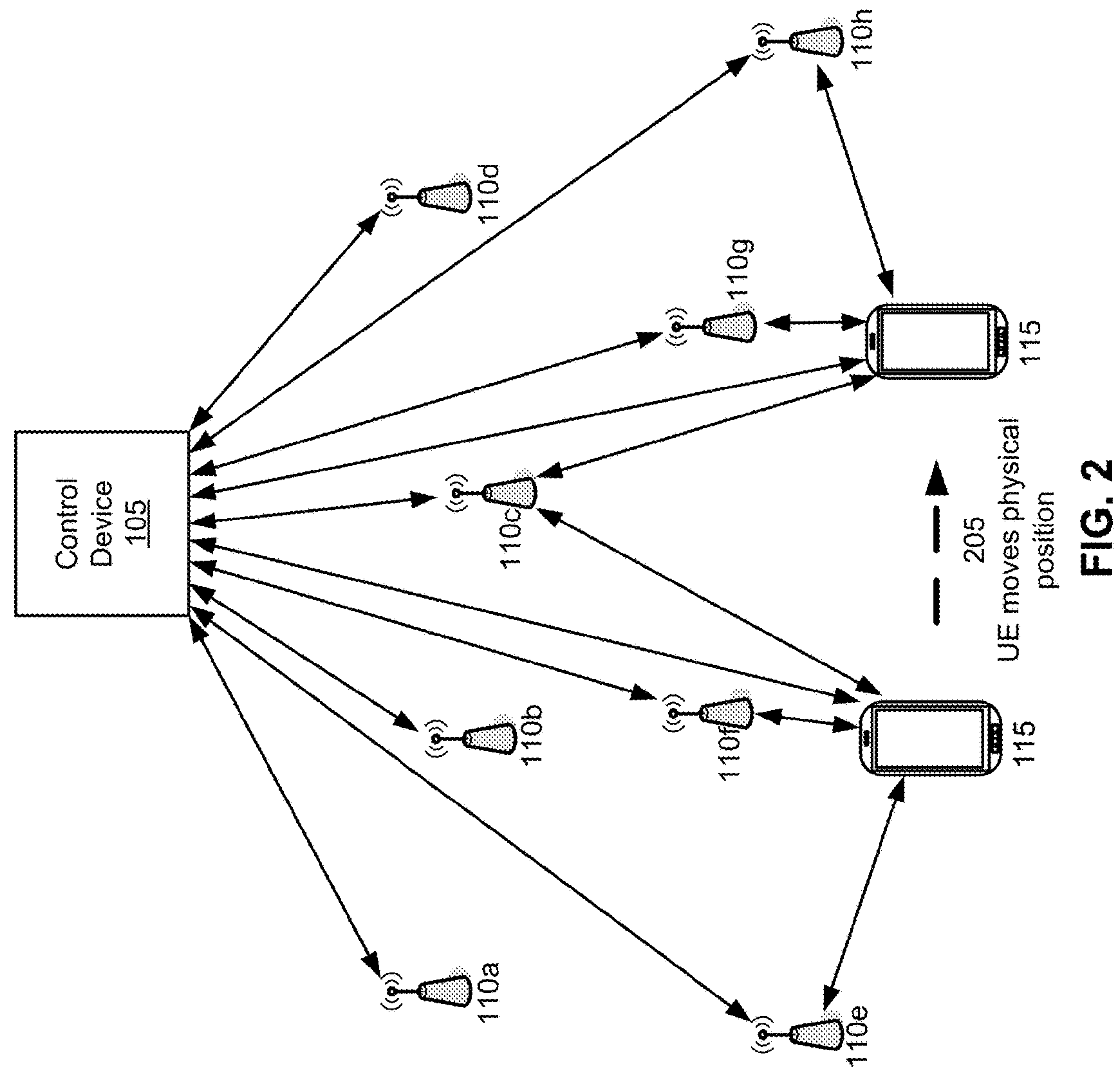
FIG. 2 is a diagram of an example associated with a network MIMO scheme.

FIG. 2 is a diagram of an example 200 associated with a network MIMO scheme. As shown in FIG. 2, example 200 includes the control device 105, one or more RUs 110 (e.g., shown as RU 110*a*, RU 110*b*, RU 110*c*, RU 110*d*, RU 110*e*, RU 110*f*, and RU 110*g* as an example), and one or more UEs 115 (e.g., shown as single UE 115 as an example). These devices are depicted and described in more detail in connection with FIGS. 3 and 4.

As shown in FIG. 2, the UE 115 may be located in a first position (e.g., a first physical or geographic position). In the first position, the UE 115 may have active connections with the RU 110*e*, the RU 110*f*, and the RU 110*c*. For example, the UE 115 may be in coverage areas of the RU 110*e*, the RU 110*f*, and the RU 110*c* in the first position. As an example, a precoding matrix used by the UE 115 to decode signals while in the first position may be $[X_{1a}, X_{2a}, X_{3a}]$, where $X_{1a}$ is a precoder to be applied by the RU 110*e* for transmissions to the UE 115, $X_{2a}$ is a precoder to be applied by the RU 110*f* for transmissions to the UE 115, and $X_{3a}$ is a precoder to be applied by the RU 110*c* for transmissions to the UE 115.

As shown by reference number 205, the UE 115 may change locations from a first position to a second position (e.g., a second physical or geographic position). In the second position, the UE 115 may have active connections with the RU 110*c*, the RU 110*g*, and the RU 110*h*. For example, the UE 115 may be in coverage areas of the RU 110*c*, the RU 110*g*, and the RU 110*h* in the second position. As an example, a precoding matrix used by the UE 115 to decode signals while in the first position may be $[X_{3a}, X_{4a}, X_{5a}]$, where $X_{3a}$ is the precoder to be applied by the RU 110*c* for transmissions to the UE 115, $X_{4a}$ is a precoder to be applied by the RU 110*g* for transmissions to the UE 115, and $X_{5a}$ is a precoder to be applied by the RU 110*h* for transmissions to the UE 115. For example, when the UE 115 moves from the first position to the second position, the UE 115 may be enabled to maintain a connection with the RU 110*c*. Therefore, as the UE 115 terminates one or more connections (e.g., due to leaving a coverage area of a given RU 110) and establishes new connections, the UE 115 may not lose an active connection because the UE 115 is enabled to maintain the connection with the RU 110*c*. For example, the UE 115 may simply update the precoding matrix used to decode signals from respective RUs 110. Therefore, a simple decoder may be used by the 115 due to orthogonality of the signals from multiple non-collocated ports (e.g., from multiple RUs 110).

As indicated above, FIG. 2 is provided as an example. Other examples may differ from what is described with regard to FIG. 2. The number and arrangement of devices shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) shown in FIG. 2 may perform one or more functions described as being performed by another set of devices shown in FIG. 2.

Figure 3:
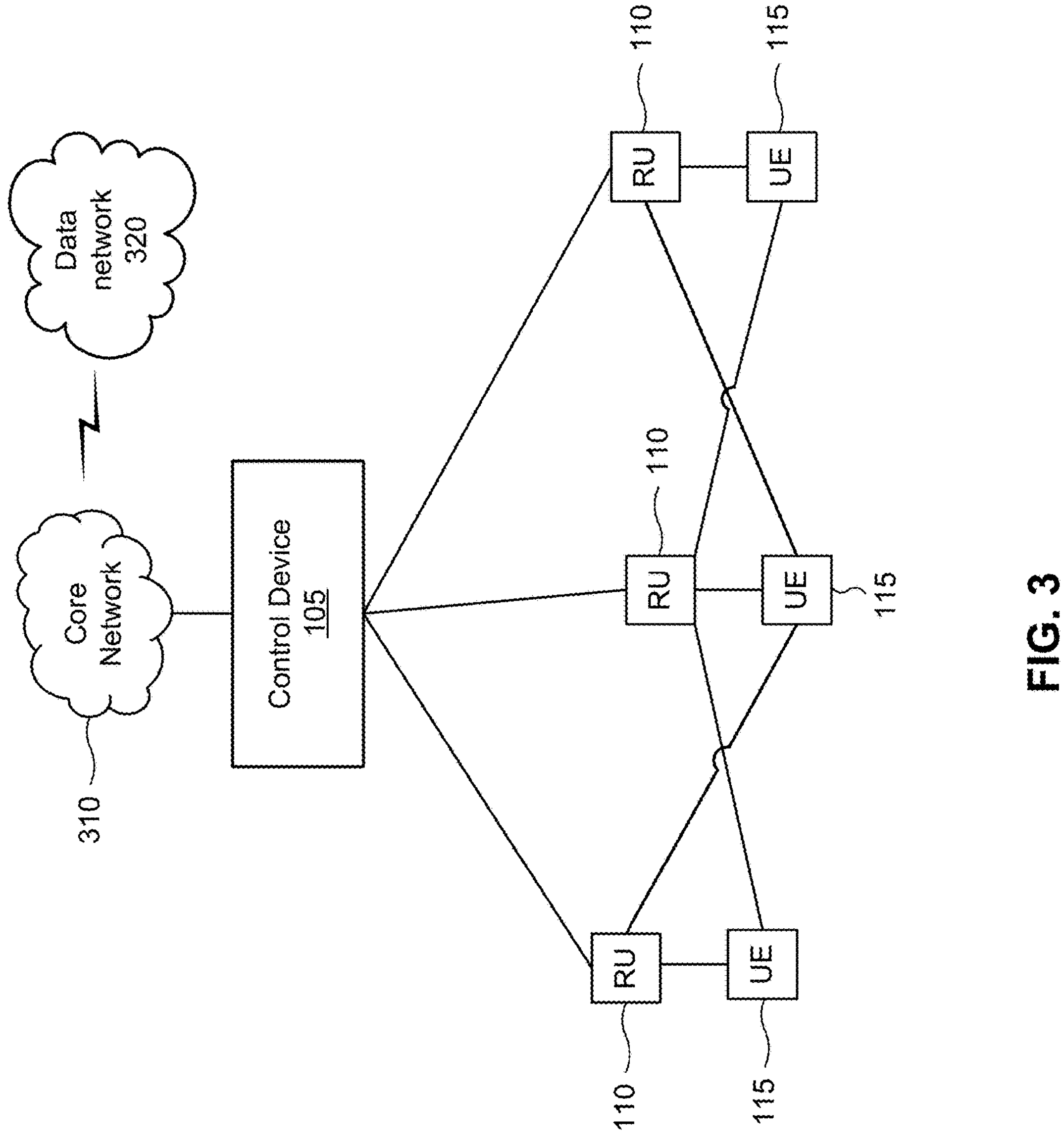
FIG. 3 is a diagram of an example environment in which systems and/or methods described herein may be implemented.

FIG. 3 is a diagram of an example environment 300 in which systems and/or methods described herein may be implemented. As shown in FIG. 3, example environment 300 may include the control device 105, one or more RUs 110, one or more UEs 115, a core network 310, and a data network 320. Devices and/or networks of example environment 300 may interconnect via wired connections, wireless connections, or a combination of wired and wireless connections.

In some implementations, the control device 105 may include a radio access network (RAN). For example, may support, for example, a cellular radio access technology (RAT). The control device 105 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices), a central unit (CU), a distributed unit (DU), and other network entities that can support wireless communication for a UE 115. The control device 105 may transfer traffic between a UE 115 (e.g., using a cellular RAT), one or more base stations (e.g., using a wireless interface or a backhaul interface, such as a wired backhaul interface), and/or core network 310. The control device 105 may provide one or more cells that cover geographic areas.

In some implementations, the control device 105 may perform scheduling and/or resource management for a UE 115 covered by the control device 105 (e.g., a UE 115 covered by a cell provided by the control device 105 and/or provided by an RU 110 managed by the control device 105). In some implementations, the control device 105 may be controlled or coordinated by a network controller, which may perform load balancing, network-level configuration, and/or other operations. In some implementations, the control device 105 may be, or may include, the network controller. The network controller may communicate with the control device 105 via a wireless or wireline backhaul. In some implementations, the control device 105 may include a network controller, a self-organizing network (SON) module or component, or a similar module or component. In other words, the control device 105 may perform network control, scheduling, and/or network management functions (e.g., for uplink, downlink, and/or sidelink communications of a UE 115 covered by the control device 105).

In some implementations, the term "base station" or "RAN" may refer to an aggregated base station, a disaggregated base station, an integrated access and backhaul (IAB) node, a relay node, and/or one or more components thereof. For example, "base station" or "RAN" may refer to a CU, a DU, an RU, a Near-Real Time (Near-RT) RAN Intelligent Controller (RIC), or a Non-Real Time (Non-RT) RIC, or a combination thereof. For example, "base station" or "RAN" may refer to one device configured to perform one or more functions. In some implementations, "base station" or "RAN" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," or "RAN" may refer to any one or more of those different devices. For example, the environment 300 may be arranged in multiple manners with various components or constituent parts.

In the environment 300, a network, a network node, a network entity, a mobility element of a network, a RAN node, a core network node, a network element, a base station, or a network equipment may be implemented in an aggregated or disaggregated architecture. For example, the control device 105 may include a CU. A CU may be implemented within a RAN node, and one or more DUs may be co-located with the CU, or alternatively, may be geographically or virtually distributed throughout one or multiple other RAN nodes. The DUs may be implemented to communicate with one or more RUs 110. Each of the CU, DU, and RU 110 also may be implemented as virtual units (e.g., a virtual central unit (VCU), a virtual distributed unit (VDU), or a virtual radio unit (VRU)).

For example, an RU 110 may be a transmitter (e.g., a radio transmitter), an access point, a TRP, a radio node, and/or a relay node, among other examples. In some implementations, an RU 110 may implement or support lower layer functionality. For example, an RU 110 may be controlled by the control device 105. In some implementations, each RU 110 can be operated to handle over the air (OTA) communication with one or more UEs 115. In some implementations, real-time and non-real-time aspects of control and user plane communication with the RU(s) 110 can be controlled by the control device 105. For example, an RU 110 may perform operations such as PHY layer operations, MAC layer operations, and/or digital beamforming, among other examples. For example, an RU 110 and a UE 115 may communicate via a radio access link. In some implementations, an RU 110 and the control device 105 may communicate via a midhaul link and/or a backhaul link.

A UE 115 includes one or more devices capable of receiving, generating, storing, processing, and/or providing information, such as information described herein. For example, a UE 115 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

In some implementations, core network 310 may include an example functional architecture in which systems and/or methods described herein may be implemented. For example, core network 310 may include an example architecture of a fifth generation (5G) next generation (NG) core network included in a 5G wireless telecommunications system. While the example architecture of core network 310 shown in FIG. 3 may be an example of a service-based architecture, in some implementations, core network 310 may be implemented as a reference-point architecture and/or a 4G core network, among other examples.

The core network 310 may include a number of functional elements. The functional elements may include, for example, a network slice selection function (NSSF), a network exposure function (NEF), an authentication server function (AUSF), a unified data management (UDM) component, a policy control function (PCF), an application function (AF), an access and mobility management function (AMF), a session management function (SMF), and/or a user plane function (UPF), among other examples. These functional elements may be communicatively connected via a message bus. Each of the functional elements may be implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

Data network 320 includes one or more wired and/or wireless data networks. For example, data network 320 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of example environment 300 may perform one or more functions described as being performed by another set of devices of example environment 300.

Figure 4:
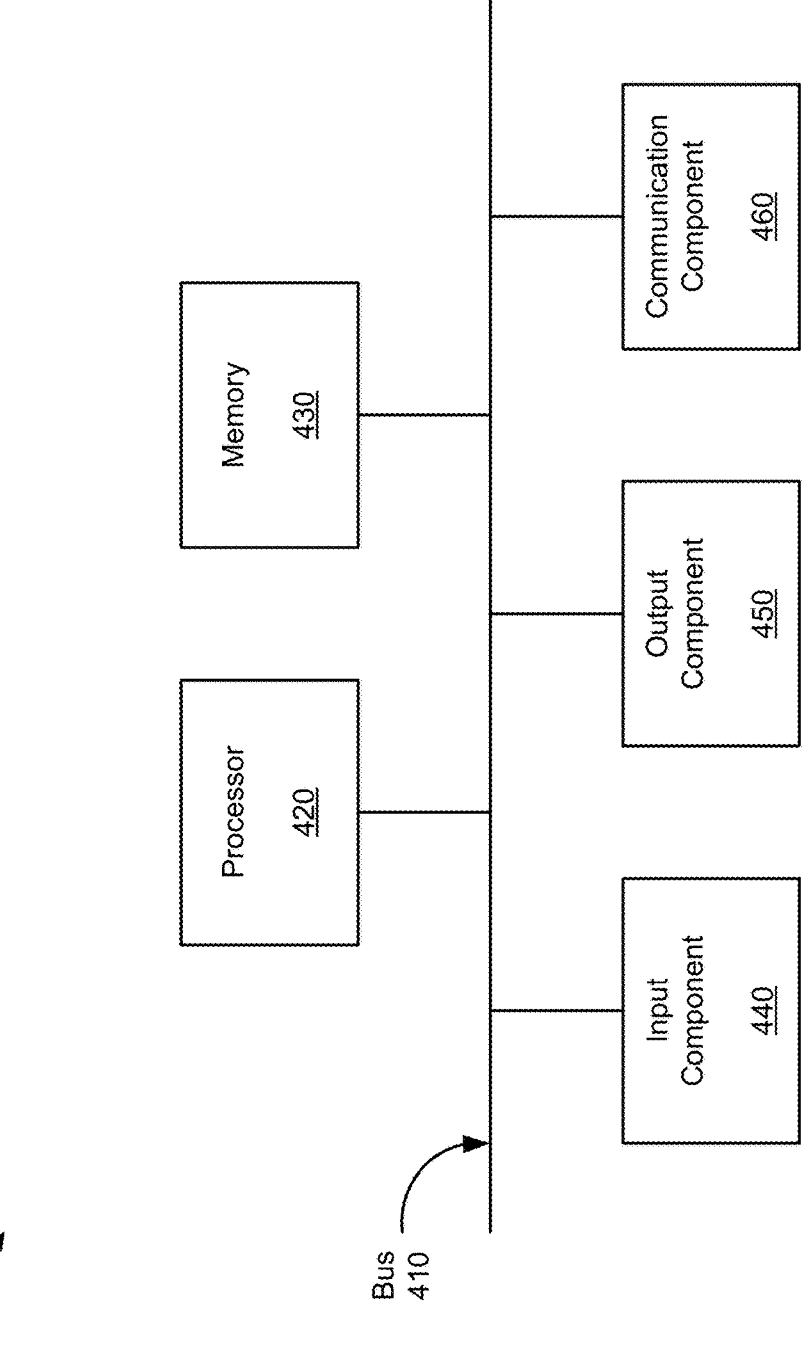
FIG. 4 is a diagram of example components of a device associated with a network MIMO scheme.

FIG. 4 is a diagram of example components of a device 400 associated with a network MIMO scheme. The device 400 may correspond to the control device 105, an RU 110, and/or a UE 115, among other examples. In some implementations, the control device 105, an RU 110, and/or a UE 115, among other examples, may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
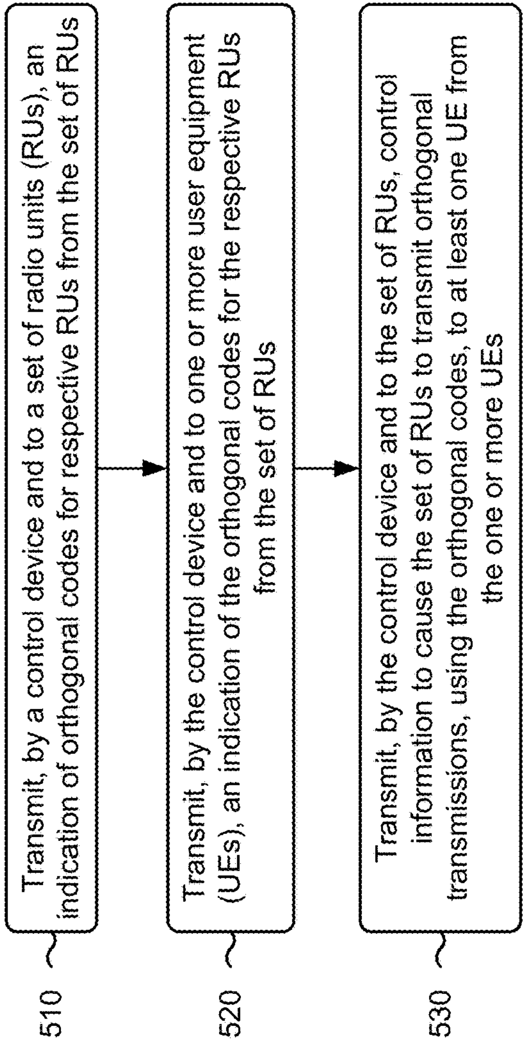
FIG. 5 is a flowchart of an example process associated with a MIMO scheme.

FIG. 5 is a flowchart of an example process 500 associated with a network MIMO scheme. In some implementations, one or more process blocks of FIG. 5 may be performed by a control device (e.g., control device 105). In some implementations, one or more process blocks of FIG. 5 may be performed by another device or a group of devices separate from or including the control device, such as an RU (e.g., RU 110), and/or UE (e.g., UE 115). Additionally, or alternatively, one or more process blocks of FIG. 5 may be performed by one or more components of device 400, such as processor 420, memory 430, input component 440, output component 450, and/or communication component 460.

As shown in FIG. 5, process 500 may include transmitting, to a set of RUs, an indication of orthogonal codes for respective RUs from the set of RUs (block 510). For example, the control device may transmit, to a set of RUs, an indication of orthogonal codes for respective RUs from the set of RUs, wherein the set of RUs are non-collocated, as described above. In some implementations, the set of RUs are non-collocated. In some implementations, the orthogonal codes are precoders. In some examples, the orthogonal codes include at least one of an Alamouti space-time coding matrix, an orthogonal matrix, or a Walsh code.

As further shown in FIG. 5, process 500 may include transmitting, to one or more UEs, an indication of the orthogonal codes for the respective RUs from the set of RUs (block 520). For example, the control device may transmit, to one or more UEs, an indication of the orthogonal codes for the respective RUs from the set of RUs, as described above.

As further shown in FIG. 5, process 500 may include transmitting, to the set of RUs, control information to cause the set of RUs to transmit orthogonal transmissions, using the orthogonal codes, to at least one UE from the one or more UEs (block 530). For example, the control device may transmit, to the set of RUs, control information to cause the set of RUs to transmit orthogonal transmissions, using the orthogonal codes, to at least one UE from the one or more UEs, as described above.

In some implementations, the control information is associated with controlling at least one of one or more MAC layer operations of the set of RUs, or one or more PHY layer operations of the set of RUs. In some implementations, the control information includes scheduling information associated with synchronizing, in a time domain, the orthogonal transmissions.

In some implementations, process 500 includes receiving, by the control device, channel information, associated with channels between RUs and UEs, from the respective RUs, wherein an orthogonal code, from the orthogonal codes, for an RU, from the set of RUs, is based on an estimated channel, indicated by the channel information, associated with a channel, from the channels, that is associated with the RU. In some implementations, the orthogonal code is associated with an inverse of the estimated channel.

In some implementations, the control device includes at least one of a base station, a central unit (CU), or a distributed unit (DU).

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
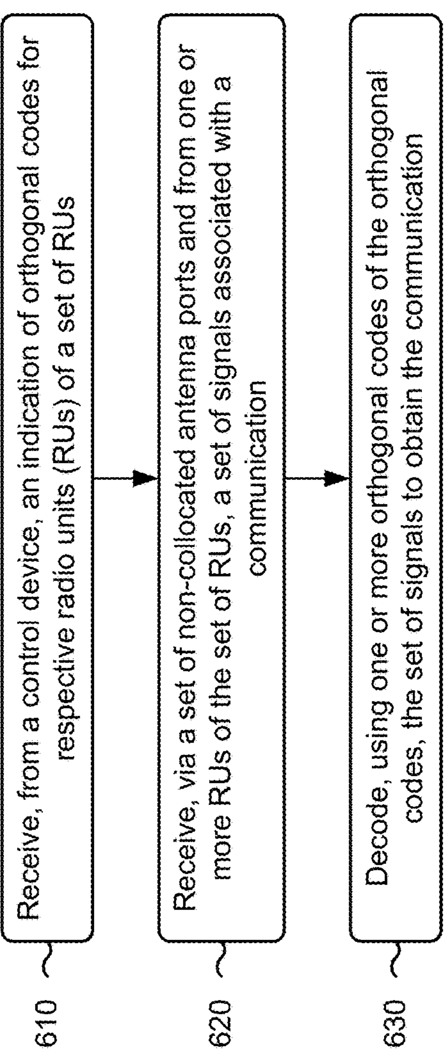
FIG. 6 is a flowchart of an example process associated with a network MIMO scheme.

FIG. 6 is a flowchart of an example process 600 associated with a network MIMO scheme. In some implementations, one or more process blocks of FIG. 6 may be performed by an UE (e.g., UE 115). In some implementations, one or more process blocks of FIG. 6 may be performed by another device or a group of devices separate from or including the UE, such as a control device (e.g., the control device 105), and/or an RU (e.g., an RU 110), among other examples. Additionally, or alternatively, one or more process blocks of FIG. 6 may be performed by one or more components of device 400, such as processor 420, memory 430, input component 440, output component 450, and/or communication component 460.

As shown in FIG. 6, process 600 may include receiving, from a control device, an indication of orthogonal codes for respective RUs of a set of RUs (block 610). For example, the UE may receive, from a control device, an indication of orthogonal codes for respective RUs of a set of RUs, as described above. In some implementations, the orthogonal codes are precoders. For example, the orthogonal codes may include at least one of an Alamouti space-time coding matrix, an orthogonal matrix, or a Walsh code.

As further shown in FIG. 6, process 600 may include receiving, via a set of non-collocated antenna ports and from one or more RUs of the set of RUs, a set of signals associated with a communication (block 620). For example, the UE may receive, via a set of non-collocated antenna ports and from one or more RUs of the set of RUs, a set of signals associated with a communication, as described above. In some implementations, the set of signals are associated with orthogonal transmissions from the one or more RUs.

As further shown in FIG. 6, process 600 may include decoding, using one or more orthogonal codes of the orthogonal codes, the set of signals to obtain the communication (block 630). For example, the UE may decode, using one or more orthogonal codes of the orthogonal codes, the set of signals to obtain the communication, as described above. In some implementations, the orthogonal code is based on an inverse of an estimated channel of the channel, wherein the estimated channel is based on the one or more channel conditions.

In some implementations, process 600 includes decoding the set of signals using a precoding matrix that includes a first orthogonal code associated with the first RU and a second orthogonal code associated with the second RU, and an estimated channel matrix associated with a first channel between the UE and the first RU and a second channel between the UE and the second RU.

In some implementations, process 600 includes transmitting, to the control device or an RU, an indication of one or more channel conditions associated with a channel between the UE and the RU, wherein an orthogonal code, from the orthogonal code, that is associated with the RU is based on the one or more channel conditions.

In some implementations, process 600 includes ceasing the first connection while maintain the second connection based on a physical location of the UE changing, establishing a third connection with a third RU based on the physical location of the UE changing, receiving another set of signals associated with another communication, and decoding the other set of signals using another precoding matrix that includes the second orthogonal code associated with the second RU and a third orthogonal code associated with the third RU, and another estimated channel matrix associated with the second channel between the UE and the second RU and a third channel between the UE and the third RU.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

transmitting, by a control device and to a set of radio units (RUs), an indication of orthogonal codes for respective RUs from the set of RUs, wherein the control device is configured to dynamically update the orthogonal codes based on instantaneous channel information as a physical location of a user equipment (UE) changes, and wherein the set of RUs are non-collocated;

transmitting, to one or more UEs, an indication of the orthogonal codes; and transmitting, by the control device and to the set of RUs, control information to cause the set of RUs to transmit orthogonal transmissions, using the orthogonal codes, to at least one UE from the one or more UEs.

2. The method of claim 1, wherein the control information is associated with controlling at least one of one or more medium access control (MAC) layer operations of the set of RUs, or one or more physical (PHY) layer operations of the set of RUs.

3. The method of claim 1, further comprising:

receiving, by the control device, channel information, associated with channels between RUs and UEs, from the respective RUs, wherein an orthogonal code, from the orthogonal codes, for an RU, from the set of RUs, is based on an estimated channel, indicated by the channel information, associated with a channel, from the channels, that is associated with the RU.

4. The method of claim 3, wherein the orthogonal code is associated with an inverse of the estimated channel.

5. The method of claim 1, wherein the control information includes scheduling information associated with synchronizing, in a time domain, the orthogonal transmissions.

6. The method of claim 1, wherein the orthogonal codes are precoders.

7. The method of claim 1, wherein the orthogonal codes include at least one of:

an Alamouti space-time coding matrix, an orthogonal matrix, or a Walsh code.

8. The method of claim 1, wherein the control device includes at least one of a base station, a central unit (CU), or a distributed unit (DU).

9. A user equipment (UE), comprising:

one or more processors configured to:

receive, from a device, an indication of orthogonal codes for respective radio units (RUs) of a set of RUs, wherein the orthogonal codes are dynamically updated based on instantaneous channel information as the UE moves through coverage areas;

receive, via a set of non-collocated antenna ports and from one or more RUs of the set of RUs, a set of signals associated with a communication; and decode, using one or more orthogonal codes of the orthogonal codes, the set of signals to obtain the communication.

10. The UE of claim 9, wherein the set of signals are associated with orthogonal transmissions from the one or more RUs.

11. The UE of claim 9, wherein the one or more processors are further configured to:

transmit, to a control device or an RU, an indication of one or more channel conditions associated with a channel between the UE and the RU, wherein an orthogonal code, from the orthogonal code, that is associated with the RU is based on the one or more channel conditions.

12. The UE of claim 11, wherein the orthogonal code is based on an inverse of an estimated channel of the channel, wherein the estimated channel is based on the one or more channel conditions.

13. The UE of claim 9, wherein the orthogonal codes are precoders.

14. The UE of claim 9, wherein the orthogonal codes include at least one of:

an Alamouti space-time coding matrix, an orthogonal matrix, or a Walsh code.

15. The UE of claim 9, wherein the UE is associated with a first connection with a first RU and a second connection with a second RU, and wherein the one or more processors, to decode the set of signals, are configured to:

decode the set of signals using:

a precoding matrix that includes a first orthogonal code associated with the first RU and a second orthogonal code associated with the second RU, and an estimated channel matrix associated with a first channel between the UE and the first RU and a second channel between the UE and the second RU.

16. The UE of claim 15, wherein the one or more processors are further configured to:

cease the first connection while maintain the second connection based on a physical location of the UE changing;

establish a third connection with a third RU based on the physical location of the UE changing;

receive another set of signals associated with another communication; and decode the other set of signals using:

another precoding matrix that includes the second orthogonal code associated with the second RU and a third orthogonal code associated with the third RU, and another estimated channel matrix associated with the second channel between the UE and the second RU and a third channel between the UE and the third RU.

17. A non-transitory computer-readable medium storing a set of instructions, the set of instructions comprising:

one or more instructions that, when executed by one or more processors of a control device, cause the control device to:

transmit, to a set of radio units (RUs), an indication of orthogonal codes for respective RUs from the set of RUs, wherein the control device is configured to dynamically update the orthogonal codes based on instantaneous channel information as a user equipment (UE) moves through coverage areas, and wherein the set of RUs are non-collocated;

transmit, to one or more UEs, an indication of the orthogonal codes; and transmit, to the set of RUs, control information to cause the set of RUs to transmit orthogonal transmissions, using the orthogonal codes, to at least one UE from the one or more UEs.

18. The non-transitory computer-readable medium of claim 17, wherein the control information is associated with controlling at least one of one or more a medium access control (MAC) layer operations of the set of RUs, or one or more physical (PHY) layer operations of the set of RUs.

19. The non-transitory computer-readable medium of claim 17, wherein the one or more instructions further cause the control device to:

receive channel information, associated with channels between RUs and UEs, from the respective RUs, wherein an orthogonal code, from the orthogonal codes, for an RU, from the set of RUs, is based on an estimated channel, indicated by the channel information, associated with a channel, from the channels, that is associated with the RU.

20. The non-transitory computer-readable medium of claim 17, wherein the orthogonal codes are precoders.

* * * * *